(12) United States Patent
Ribu et al.

(10) Patent No.: US 11,072,458 B2
(45) Date of Patent: Jul. 27, 2021

(54) CONTAINER WITH OLEOPHILIC/OLEOPHOBIC PATTERN ON A SEALING SURFACE

(71) Applicant: Stora Enso OYJ, Helsinki (FI)

(72) Inventors: Ville Ribu, Lappeenranta (FI); Nina Miikki, Imatra (FI)

(73) Assignee: Stora Enso OYJ, Helsinki (FI)

( * ) Notice: Subject to any disclaimer, the term of this patent is extended or adjusted under 35 U.S.C. 154(b) by 151 days.

(21) Appl. No.: 15/736,976

(22) PCT Filed: Jun. 16, 2016

(86) PCT No.: PCT/IB2016/053559
§ 371 (c)(1),
(2) Date: Dec. 15, 2017

(87) PCT Pub. No.: WO2016/203411
PCT Pub. Date: Dec. 22, 2016

(65) Prior Publication Data
US 2018/0370678 A1 Dec. 27, 2018

(30) Foreign Application Priority Data
Jun. 18, 2015 (SE) .................... 1550855-9

(51) Int. Cl.
*B65D 5/56* (2006.01)
*B65D 65/42* (2006.01)
(Continued)

(52) U.S. Cl.
CPC .............. *B65D 5/563* (2013.01); *B32B 27/10* (2013.01); *B32B 29/06* (2013.01);
(Continued)

(58) Field of Classification Search
CPC ...... B65D 5/563; B65D 5/48002; B65D 5/62; B65D 65/42; B65D 77/2024; B65D 81/34;
(Continued)

(56) References Cited

U.S. PATENT DOCUMENTS 3,354,022 A  11/1967  Harold et al.
3,863,832 A * 2/1975  Gordon ................ B65D 5/2047
                                                229/125.35

(Continued)

FOREIGN PATENT DOCUMENTS

CN    103946322 A    7/2014
EP    0933388 A2     8/1999
(Continued)

OTHER PUBLICATIONS

International Search Report for PCT/IB2016/053559, dated Sep. 23, 2016.

*Primary Examiner* — Christopher R Demeree
(74) *Attorney, Agent, or Firm* — Greer, Burns & Crain, Ltd

(57) ABSTRACT

The disclosure relates to a container (10) comprising a sealing surface (15), wherein the sealing surface (15) is provided with a pattern (30) of ridges (31, 32) and valleys (33), and wherein the sealing surface (15) has a) oleophobic and/or b) oleophilic properties: a) repelling fat such that any fat on the sealing surface (15) has a tendency not to stick to the pattern (30) on the sealing surface thus creating an essentially fat-free sealing surface orb) attracting fat such that any fat on the sealing surface (15) has a tendency to settle down in the valleys (33) of the pattern (30) on the sealing surface, respectively.

15 Claims, 5 Drawing Sheets

(51) Int. Cl.
*B65D 77/20* (2006.01)
*B32B 27/10* (2006.01)
*B32B 29/06* (2006.01)
*B65D 81/34* (2006.01)
*B65D 5/48* (2006.01)
*C08J 7/04* (2020.01)
*B65D 5/62* (2006.01)

(52) U.S. Cl.
CPC ........... *B65D 5/48002* (2013.01); *B65D 5/62* (2013.01); *B65D 65/42* (2013.01); *B65D 77/2024* (2013.01); *B65D 81/34* (2013.01); *C08J 7/0427* (2020.01)

(58) Field of Classification Search
CPC .......... B32B 27/10; B32B 29/06; C08J 7/047; B29C 66/72; B29C 66/72328; B29C 66/7234; B29C 66/72343; B29C 66/73; B29C 66/7316; B29C 66/7317; B29C 66/73172
USPC .......... 229/5.82; 156/69, 278, 279, 280, 292
See application file for complete search history.

(56) References Cited

U.S. PATENT DOCUMENTS

| | | | | |
|---|---|---|---|---|
| 4,900,594 A * | 2/1990 | Quick | ...................... | B32B 27/10 428/34.2 |
| 5,203,491 A * | 4/1993 | Marx | ...................... | A21B 3/131 220/573.1 |
| 5,213,902 A * | 5/1993 | Beckett | ...................... | B32B 3/10 428/597 |
| 5,354,973 A * | 10/1994 | Beckett | ............. | B65D 81/3446 219/728 |
| 5,425,972 A * | 6/1995 | Calvert | ................ | B65D 5/2047 229/5.81 |
| 6,093,460 A * | 7/2000 | Iwaya | .................... | B31F 1/0087 156/224 |
| 6,150,646 A * | 11/2000 | Lai | ....................... | B65D 77/042 219/728 |
| 6,237,843 B1 * | 5/2001 | Falat | .................... | B65D 51/245 206/459.5 |
| 6,773,786 B1 * | 8/2004 | Kuckart | ................ | D21F 1/0027 428/141 |
| 8,007,638 B2 * | 8/2011 | Baker | .................... | D21H 21/16 162/123 |
| 9,546,299 B2 * | 1/2017 | Gesford | ................ | C09D 175/04 |
| 10,066,109 B2 * | 9/2018 | Pett | ........................ | C09D 1/00 |
| 10,266,702 B2 * | 4/2019 | Curran | ................... | C09D 5/00 |
| 2004/0137202 A1 * | 7/2004 | Hamilton | ................ | B65D 65/14 428/174 |
| 2006/0081554 A1 | 4/2006 | Snyder | | |
| 2007/0267374 A1 * | 11/2007 | Middleton | ........ | B29C 45/14336 211/126.1 |
| 2015/0083727 A1 | 3/2015 | Smolko et al. | | |

FOREIGN PATENT DOCUMENTS

| | | | |
|---|---|---|---|
| EP | 2762537 A1 | 8/2014 | |
| JP | H07277326 A | 10/1995 | |
| JP | 2003231540 A | 8/2003 | |
| JP | 2013071779 A | 4/2013 | |
| JP | 2013159344 A | 8/2013 | |
| JP | 2013188988 A | 9/2013 | |
| JP | 2014080465 A | 5/2014 | |
| JP | 2015058947 A | 3/2015 | |
| KR | 101320537 B1 | 10/2013 | |
| WO | WO-0154810 A1 * | 8/2001 | ......... B32B 37/0023 |
| WO | 2014087695 A1 | 6/2014 | |

* cited by examiner

CONTAINER WITH OLEOPHILIC/OLEOPHOBIC PATTERN ON A SEALING SURFACE

This application is a U.S. National Stage under 35 U.S.C. § 371 of International Application No. PCT/IB2016/053559, filed Jun. 16, 2016, which claims priority to Swedish patent application No. 1550855-9, filed Jun. 18, 2015.

FIELD OF INVENTION

The inventions relates to a container with a sealing surface. The container may have basically any shape and use. It may be a box shaped container, a gable top container, a bottle, a cup, etc. The sealing surface may e.g. be used for attachment of a plastic cover by heat sealing or heat fusing of the plastic cover to the sealing surface. One example of such containers is e.g. a tray, such as a microwavable tray for food products. The sealing surface may also be used to seal different portions of the container to each other, such as the top seal of a gable top container where two opposing wall portions are sealed to each other. The sealing surface may be used for heat-sealing or heat-fusing. The sealing surface may alternatively be used for other kinds of attachment or sealing methods, such as gluing.

TECHNICAL BACKGROUND

It is well-known to distribute ready to heat food in paperboard trays covered with a cover of a film of a polymeric material. The paperboard of the trays is typically coated with a polymeric material. This makes the trays tight and provides resistance to fat and moisture which otherwise tend to penetrate into the paperboard impair strength and tightness of the paperboard. The polymeric material is also used for heat sealing or heat fusing the cover to a sealing surface on a rim or perimeter of the sidewalls of the tray. It has been found that when the food is filled into the tray or when the food is cooked in the oven before the cover is attached and the container is ready for distribution, there is a tendency that fat or food spatters on the sealing surface of the tray. An oily spot on the flange tray may cause non-satisfactory fusing or sealing of the cover to the tray.

WO2014/049518 A1 discloses a coating on a paperboard where the coating is provided to prevent food to stick to the surface. The document discloses that the coating has super- or highly hydrophobic properties. It also discloses the use of oleophobic wax to improve the non-stick properties.

GB2272399A discloses a packaging material comprising a multilayer structure made essentially out of paper. The packaging material comprises at least two layers A and B of paper, respectively an internal layer and an external layer. The layer A is absorbent and contains at least one chemical agent suitable for imparting wet strength thereto. Layer B includes at least one oleophobic additive suitable for imparting resistance thereto in particular against fats and water, said layer having an outside face treated with a hydrophobic coating agent. This packaging material is said to be particularly suitable for making trays for selling meat, that are recyclable and that absorb exudates, but without detracting from presentation.

SUMMARY OF INVENTION

It is an object of the invention to address the issue of non-satisfactory attachment, such as a sealing, fusing or gluing, at the sealing surface container due to food, fat or oil spatter on the sealing surface.

This object has been achieved by a container which is of the kind indicated in the introductory part of the description and which is characterised in that the sealing surface is coated with a polymer coating in which a pattern of ridges and valleys is formed.

The sealing surface may, according to a first aspect of the present invention have oleophobic properties repelling fat such that any fat on the sealing surface has a tendency not to stick to the pattern on the sealing surface thus creating an essentially fat-free sealing surface.

The sealing surface may, according to a second aspect of the present invention, instead of oleophobic properties, have oleophilic properties attracting fat such that any fat on the sealing surface has a tendency to settle down in the valleys of the pattern on the sealing surface.

With this design the sealing surface presents ridges without any fat or oil on them. These ridges without any fat or oil may be used to provide a satisfactory attachment, such as sealing, fusing or gluing.

According to a preferred embodiment of both the first and second aspect the pattern on the sealing surface may provide a combination of both features i.e. both oleophobic properties and oleophilic properties. In a sense the pattern thus provides oleophobic areas preventing the fat or oil drops from remaining on the ridges by forcing the fat or oil to flow from these r oleophobic areas to the oleophilic areas.

As mentioned above the sealing surface may be used for heat sealing a cover, such as a lid, formed of or comprising a sealing portion of a polymeric material being heat-sealable or heat-fusible to the sealing surface of the container. The sealing surface may also be used to seal different portions of the container to each other, such as the top seal of a gable top container where two opposing wall portions are sealed to each other. Said lid or cover may thus have a different material.

It should be noted that the sealing surface preferably extend fully and continuously around a perimeter such that it is possible to form a completely sealed container once the cover is sealed against the sealing surface or once the different portions of the container are sealed to each other. It may be noted that this is however not a requisite for all applications where the invention may be used.

It is intended throughout the present description that the expression "container package" embraces a package that is ready for distribution and/or for over the counter selling. Thus said container package may thus additionally contain a food dish or similar for heating in a microwave oven or a normal oven.

Preferred embodiments appear in the dependent claims and in the description. Preferred features of each aspect of the invention are as for each of the other aspects mutatis mutandis.

A distance between a top plane to which a median of the ridges extend up to and a bottom plane to which a median of the valleys extend down to may be from 2 to 200 micrometers, preferably from 2 to 100 micrometers, and most preferred from 2 to 50 micrometers. This is considered a suitable size of the ridges and valleys to provide a strong tendency for any fat or oil to settle down in the valleys of the pattern on the sealing surface.

A median distance between adjacent ridges may be from 1 to 500 micrometers, preferably from 1 to 150 micrometers, and most preferred from 1 to 50 micrometers. This is considered a suitable size of the ridges and valleys to provide a strong tendency for any fat or oil to settle down in the valleys of the pattern on the sealing surface.

The container may have a bottom wall and sidewalls formed of a paperboard, preferably integrally formed of a paperboard. This is suitable manner of providing a container or tray for e.g. microwavable packages.

The sealing surface is preferably coated with a polymer or mixture of polymers in which the pattern is formed. The polymer or mixture of polymers may have oleophilic properties attracting fat or the polymer or mixture of polymers may have oleophobic properties repelling fat. The polymer or polymer mixture may have a combination of oleophobic properties and oleophilic properties. The pattern in itself may also provide the oleophobic and/or oleophilic properties.

The pattern may be provided by mechanically forming the pattern in the upper surface of the polymer or polymer mixture, preferably with application of heat during the forming of the pattern. This may e.g. be performed simultaneously as the container is shaped. If the container is formed of a coated paperboard, the shaping of the paperboard into a tray having bottom wall and sidewalls typically includes clamping of the perimeter of the paperboard blank, whereby this clamping may be used to also provide the pattern.

Alternatively the pattern may be provided in the polymer layer in the coating step.

The container may be a food container produced from food grade materials.

The container may be a microwavable container allowing the container and food received in the container to be heated in a microwave oven or the container may be an ovenable container and thus it may be heated in a conventional oven. Thus the containers according to the first and second aspects of the invention are not sensitive to heat. Thus e.g. >100° C., these would still be active and stable. However, despite the thermal stability, this would still enable fusing of the packages.

The container may be distributed in a flat-laid state in the form of a web or sheet comprising a plurality of such flat-laid containers. This is a space efficient manner for distributing the material.

The container may be distributed in a flat-laid state in the form of individual blanks. This is in many cases a suitable balance between space efficient distribution and a desire to keep the apparatuses at the receiving end simple.

The container may be distributed in an erected state with the sidewalls extending upwardly from the bottom wall. One advantage with this is that the apparatuses at the receiving end may be kept comparably simple.

The above mentioned object of the invention has also been achieved with a container comprising a container of the above mentioned kind and a cover attached to the sealing surface.

The cover may be provided with a sealing surface being sealable to the sealing surface of the container. Preferably the sealing surface of the cover is heat sealable to the sealing surface of the container.

The cover and the container may be adapted to together form a tight container, preferably a tight food container.

Embodiments of the present invention are described as mentioned in more detail with the aid of examples of embodiments, together with the appended figures, the only purpose of which is to illustrate the invention and are in no way intended to limit its extent. The prior art document(s) mentioned herein are incorporated to the fullest extent permitted by law.

BRIEF DESCRIPTION OF THE DRAWINGS

The invention will by way of example be described in more detail with reference to the appended schematic drawings, which shows a presently preferred embodiment of the invention.

DETAILED DESCRIPTION OF PREFERRED EMBODIMENTS

Figure 1:
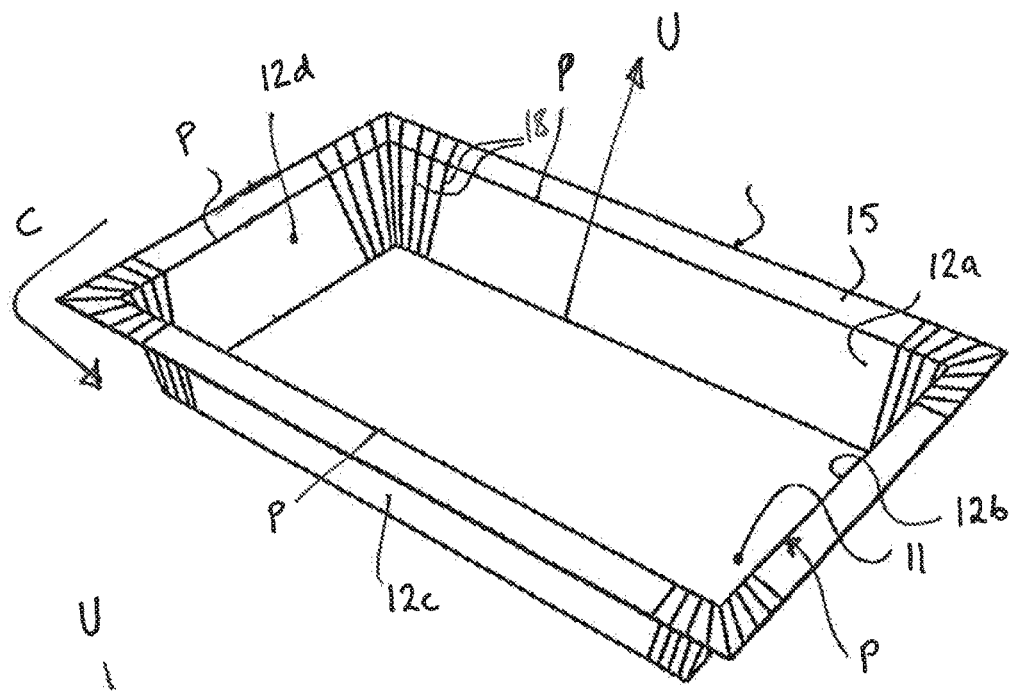
FIG. 1 discloses a container.
Figure 2:
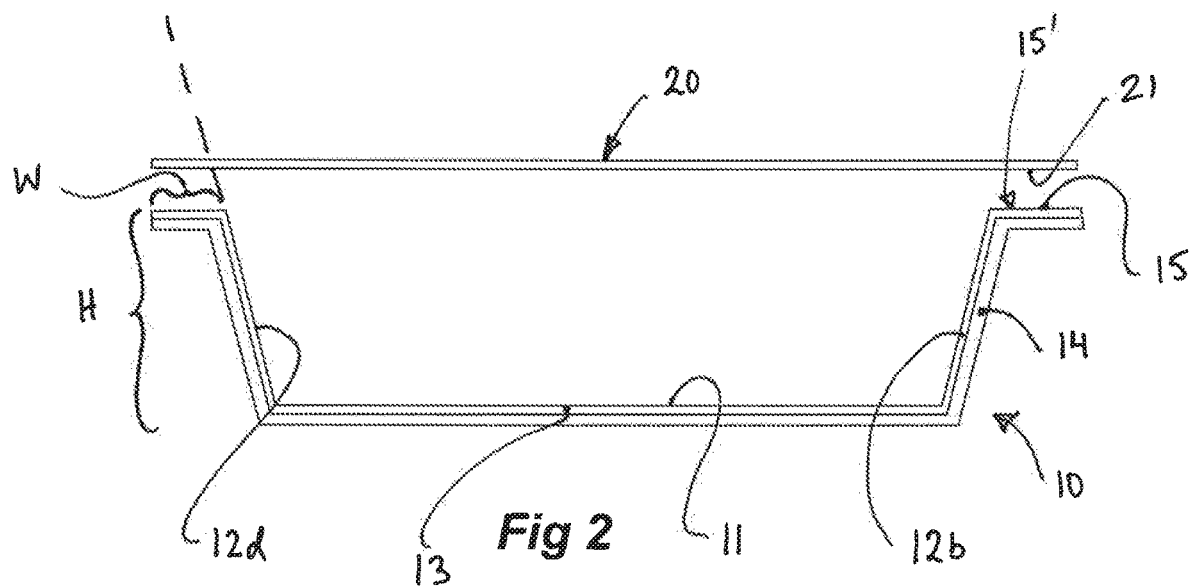
FIG. 2 is a cross-section of a container.
Figure 3:
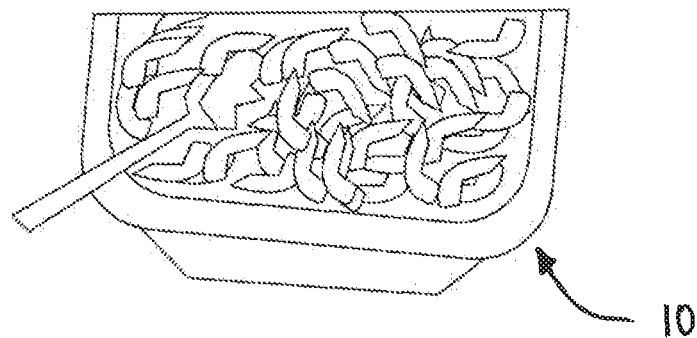
FIG. 3 is a perspective view of a container with food in it.
Figure 4:
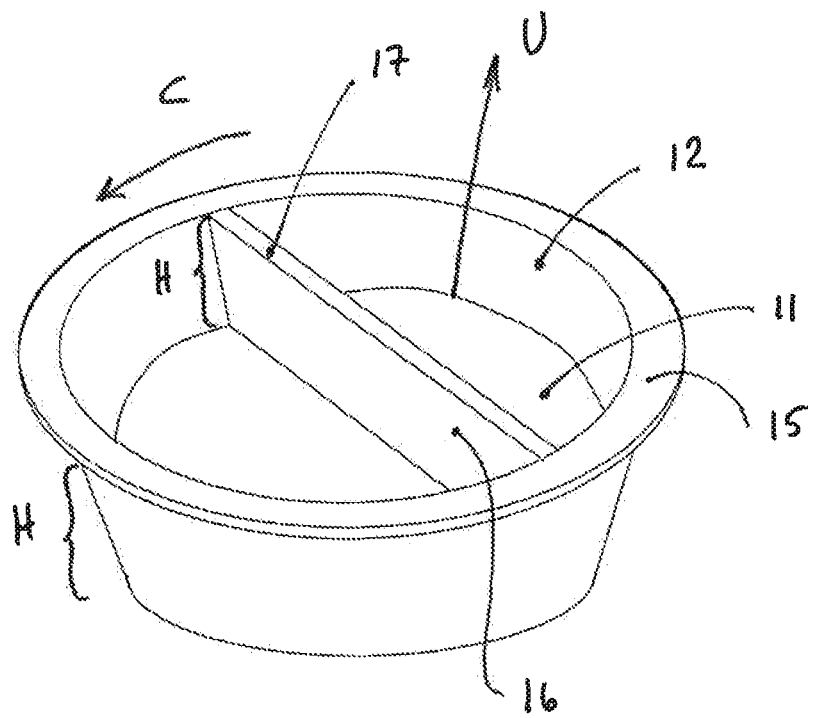
FIG. 4 is a perspective view of a container.

As is shown in FIGS. 1, 3 and 4, the container 10 may have different shapes; in FIG. 1 it is disclosed a rectangular shape with sharp corners, in FIG. 2 it is disclosed a rectangular shape with rounded corners and in FIG. 4 it is disclosed a circular shape. This kind of top-open container is sometimes referred to as a tray.

Common to this kind of container is that it comprises a bottom wall 11 and one or more sidewalls 12a-d. In the rectangular shape of FIG. 1 it may be said that there are four distinct sidewalls 12a-d or it may be said that there is a single sidewall 12 separated into four straight portions 12a-d. In the circular shape of FIG. 4 it may be said that there is a single sidewall 12. In the shape of FIG. 3 it may be said that there are four sidewalls 12a-d connected by rounded corners or it may be said that there is a single sidewall with four straight portions and four corners. The sidewalls 12 may be formed of a single continuous piece of material being creased or folded to provide the corners. The sidewalls 12 may be formed of a piece of material separate from the bottom wall 11. The tray 10 may be formed of paperboard, paperboard coated with a polymeric coating, a single polymeric material or of a plural-polymeric-layer design. In the preferred embodiment the bottom wall 11 and the sidewalls 12 are integrally formed of a paperboard 14 coated with a polymeric material 13 (which also may be a polymer mixture). The coating 13 may be the same over the complete surface area of the paperboard 14. The coating provides air and vapour tight properties to the bottom wall 11 and the sidewalls 12 of the container 10. The polymers may e.g. be polyethylene (PE), polyesters (such as PET, PLA), biopolymers, polypropylene (PP), starch-based polymers, or co-polymers thereof (such as co-polymers of PE and PP) etc. Said polymers may also be co-extruded. This means that at the same time more than 1 layer of polymer may be added as polymer coating. The polymers may be the same or they can be different from each other.

As is shown in the figures the sidewalls 12 extend upwardly in an upward direction U from the bottom wall 11 and extend in a circumferential direction C of the container 10. The container 10 is adapted to receive food (as shown in FIG. 3) and to receive a cover 20 to form a food container. It may be noted that the sidewalls 12 typically do not extend in an upward direction being orthogonal to the bottom wall 11. Typically the sidewalls 12 extend along a direction U being generally directed upwards with a slight inclination outwards.

The container 10 also comprises a sealing surface 15 forming part of or being attached to the sidewalls 12. In the preferred embodiment the sealing surface 15 is an integral extension of the sidewalls 12. The sealing surface 15 is formed on a rim along an upper perimeter P of the container 10 extending horizontally and in the circumferential direction C. The sealing surface 15 has a width W in a direction across the circumferential extension. The width W of the sealing surface is between 3-30 millimetres, preferably between 3-15 millimetres and in the disclosed embodiment it is about 10 millimetres. The sealing surface 15 is coated with a polymer coating e.g. the polymer coating 13 discussed above.

As shown in FIG. 2, a cover 20 is adapted to be attached to the sealing surface 15 of the container 10. Typically, the cover 20 is formed of thin plastic film forming an air and vapour tight container together with the container 10. In the embodiments of FIG. 1-4, the sealing surface 15 extend fully and continuously around the perimeter such that it is possible to form a completely sealed food container once the cover 20 is sealed against the sealing surface 15. The cover 20 is provided with a sealing surface 21 being heat sealable or heat-fusible to the sealing surface of the container 10. This sealing surface 21 may be formed of a polymeric material located only at the sealing surface 21. In the preferred embodiment the cover 20 is formed of a polymeric material having the property of being heat sealable to the sealing surface 15 of the container 10. The cover 20 may be a paperboard cover with the side adapted to face the sealing surface 15 being coated with a polymeric material providing heat sealability properties to the cover 20.

In FIG. 4, there is shown a partition wall 16. Such a wall 16 may have a height H less than the height H of the sidewalls 12. Alternatively, it may have about the same height H as the height H of the sidewalls 12. In the latter case, the partition wall 16 may have a sealing surface 17 adapted to be heat-sealed or heat-fused to the cover 20. This sealing surface 17 may be of conventional kind or may preferably be of the same kind as the sealing surface 25.

Figure 5:
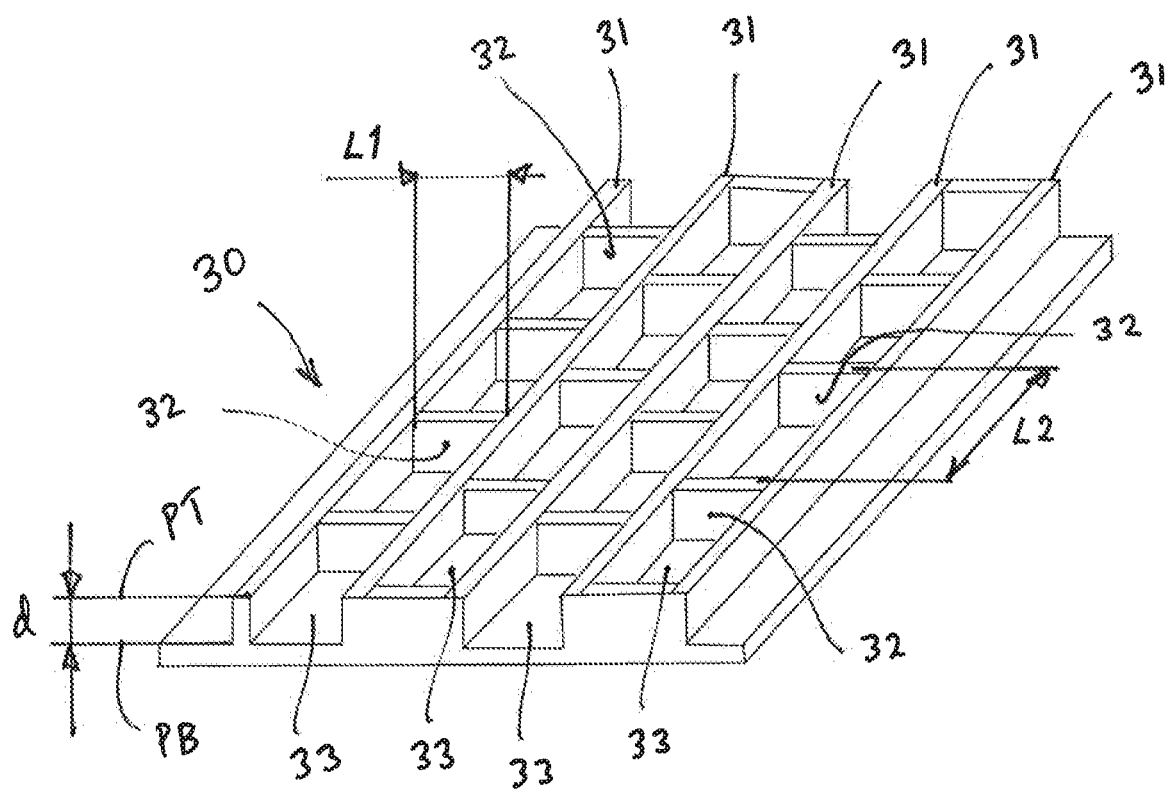
FIG. 5 is a perspective view of a pattern of ridges and valleys on a sealing surface of a container.

The sealing surface 15 is provided with a pattern of ridges and valleys. The pattern of ridges and valleys is formed in the polymer coating 13. One such pattern is schematically shown in FIG. 5. The pattern 30 is provided with one set of ridges 31 extending in parallel with each other forming valleys 33 between them. The valleys 33 may be continuous or they may be broken into shorter portions by ridges 32. These ridges 32 may extend in parallel to each other across the pattern 30. In the disclosed embodiment, the ridges 32 are arranged offset each other such that one ridge 32 in one valley 33 is not aligned with the ridge 32 in an adjacent valley 33. They may e.g. be aligned with a ridge 32 in a valley 33 next to the adjacent valley 33 or a valley 33 further away. In the disclosed embodiment the ridges 31 are orthogonal to the ridges 32. The ridges 31 and 32 have a height such that a distance between a top plane PT to which a median of the ridges 31, 32 extend up to and a bottom plane PB to which a median of the valleys 33 extend down to is between 2-500 micrometers, preferably 2-150 micrometers, and most preferably 2-50 micrometers. In the disclosed embodiment the distance is about 8 micrometers. The ridges 31 are spaced apart such that a median distance L1 between adjacent ridges 31 is between 2-500 micrometers, preferably 2-150 micrometers, and most preferably 2-50 micrometers. The ridges 32 are spaced apart such that a median distance between adjacent ridges 32 is between 2-500 micrometers, preferably 2-150 micrometers, and most preferably 2-50 micrometers. In the disclosed embodiment the distance L1 between the ridges 31 is about 10 micrometers and the distance L2 between the ridges 32 in the same valley 33 is about 15 micrometers.

Figure 6:
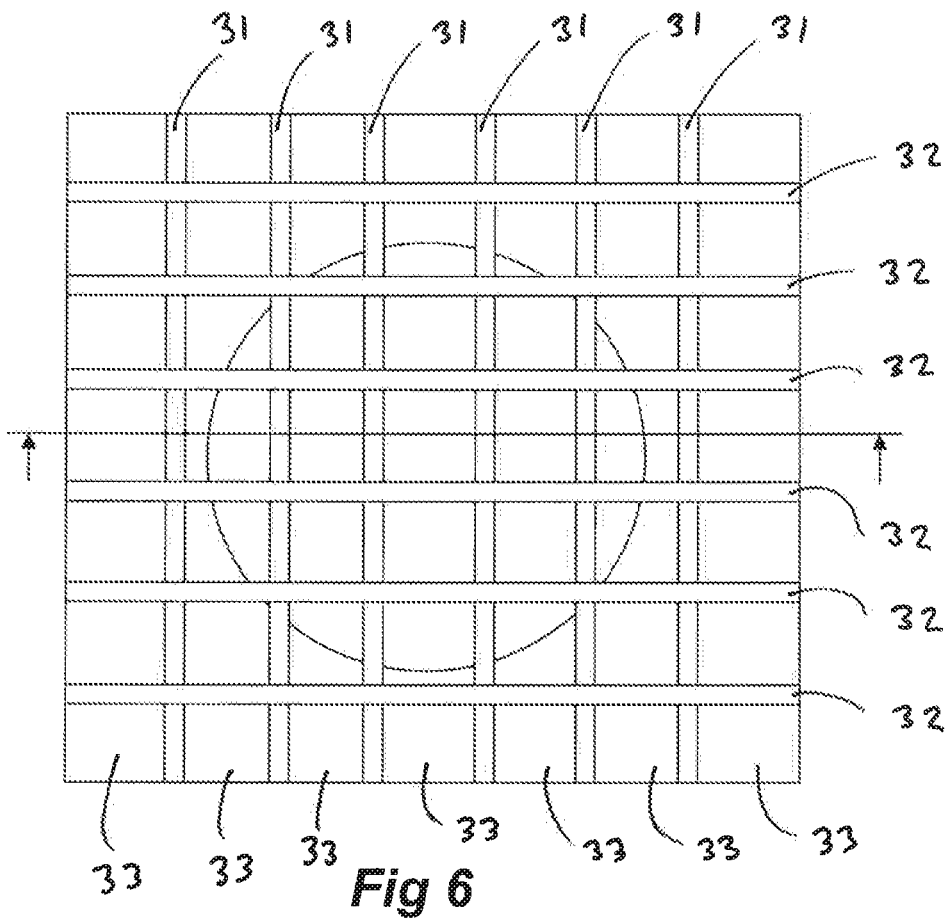
FIG. 6 is a plan view of a drop of fat or oil settled in the pattern.
Figure 7:
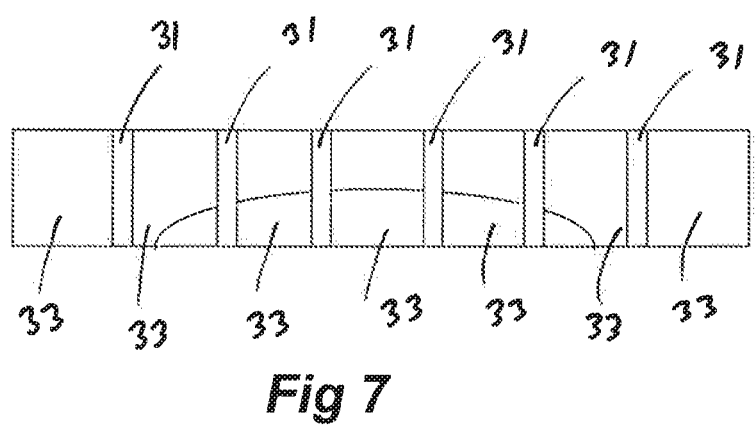
FIG. 7 is a cross-section along line A-A in FIG. 6.

The thus shaped sealing surface 15 has oleophilic properties attracting fat. Any drop of fat or oil will have a tendency to be spread out and to settle in the valleys of the pattern on the sealing surface (as is schematically shown in FIG. 6-7).

As an alternative the shaped sealing surface 15 has oleophobic properties repelling fat. These properties would then confer that any fat on the sealing surface (15) would have a tendency not to stick to the pattern (30) on the sealing surface thus creating an essentially fat-free sealing surface.

In one embodiment the container 10 is formed of paperboard 14 coated with a polymer or polymer mixture 13 having these oleophilic properties attracting fat.

As an alternative the polymer or polymer mixture 13 may have oleophobic properties repelling fat. A combination thereof is also plausible as set out earlier.

In another embodiment the oleophilic properties attracting fat is provided solely by the formation of the pattern. In such embodiment the polymer or polymer mixture as such may have other properties relative to fat or oil. In alternative embodiment the oleophobic properties repelling fat is provided solely by the formation of the pattern. In such embodiment the polymer or polymer mixture as such may have other properties relative to fat or oil. Said properties may also be combined as set out earlier.

The pattern is provided by mechanically forming the pattern in the upper surface 15' of the polymeric material, preferably with application of heat during the forming of the pattern.

The container 10 is formed of a food grade paperboard 14 and a food grade coating 13 and the materials are chosen such that the container 10 is a microwavable container allowing food received in the container to be heated in a microwave oven. Further, the cover 20 is also formed of a food grade material which preferably also is chosen such that any food in the container may be microwaved with the cover 20 still on the container 10. Typically the cover 20 is in such a case cut by the user such that there is a rift preventing pressure build up in the container during heating in the microwave.

Figure 8:
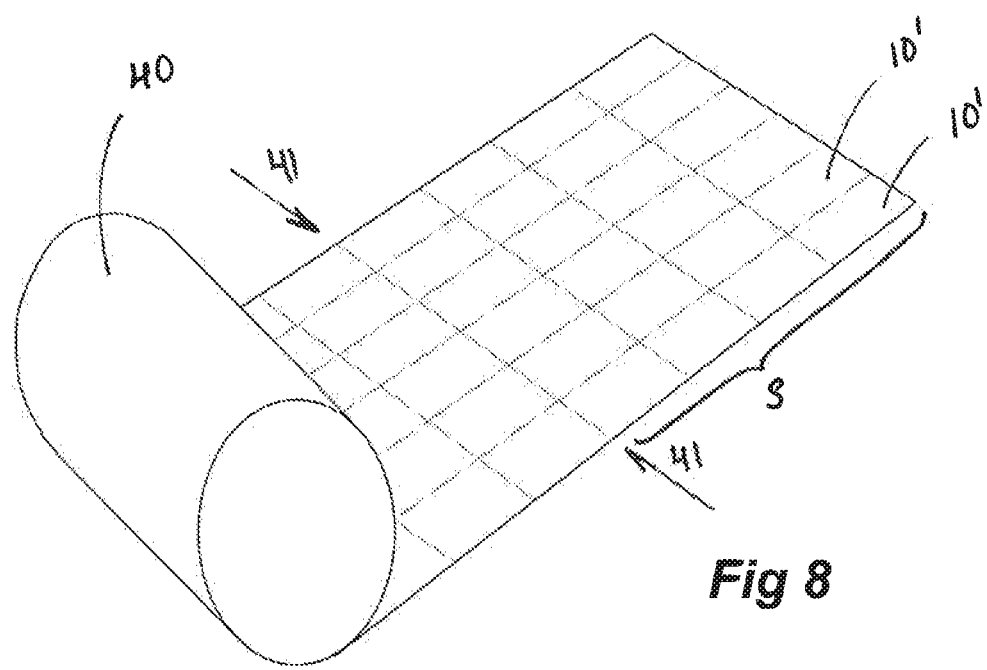
FIG. 8 discloses a web with a plurality of portions adapted to form a container.
Figure 9:
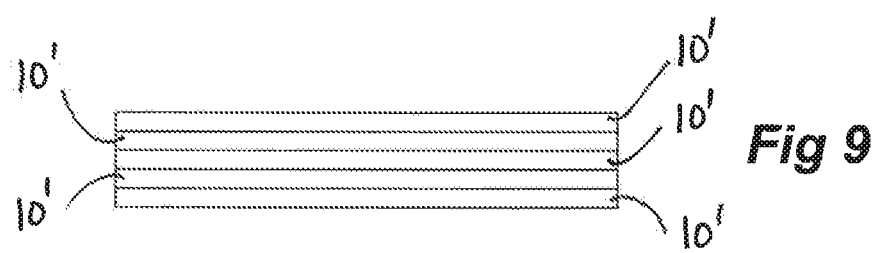
FIG. 9 discloses a stack of flat-laid blanks.
Figure 10:
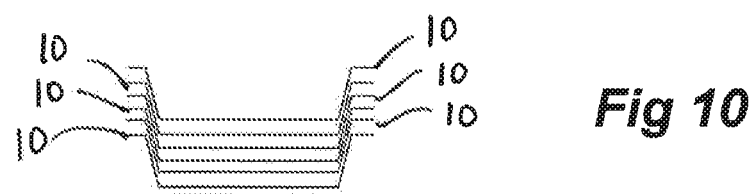
FIG. 10 discloses a stack of erected containers.

FIGS. 8-10 disclose different distribution modes.

FIG. 8 discloses the container being distributed in a flat-laid state in the form of a web 40 comprising a plurality of flat-laid blanks 10' adapted to be shaped into the containers 10. The web 40 may alternatively be cut into sheets S comprising a plurality of such flat-laid blanks 10'. Such a cut may e.g. be along the line indicated by reference numeral 41 in FIG. 8.

FIG. 9 discloses the container being distributed in a flat-laid state in the form of individual blanks 10'. The blanks 10' are stacked into a stack.

FIG. 10 discloses the container 10 being distributed in an erected state with the sidewalls 12 extending upwardly from the bottom wall 11. The containers 10 are stacked into each other forming a stack.

It is contemplated that there are numerous modifications of the embodiments described herein, which are still within the scope of the invention as defined by the appended claims.

The polymer coating 13 in which the pattern 30 of the sealing surface 15 is formed may for instance be located only on the sealing surface 15. The paperboard 13 may be non-coated or coated with another polymeric material at other portions of the container, especially at portions adapted to be in contact with the food inside the container. According to one alternative, the paperboard is fully coated with one or more first polymeric coating(s) and coated with the polymeric coating with the pattern 30 having oleophilic properties attracting fat only at the sealing surface 15. The pattern (30) may also as an alternative be oleophobic at the ridges which face the coating. According to one further alternative, the pattern (30) on the container may provide one or more oleophilic channels for conveying the food, fat, oil or emulsion.

The polymeric coating may be applied using extrusion of a molten polymer onto a paperboard. The polymeric coating may be applied by lamination of a polymeric film and a paperboard. According to one further alternative, the paperboard is fully coated with one or more first polymeric coating(s) and coated with the polymeric coating with the pattern 30 having oleophobic properties repelling fat only at the sealing surface 15.

The container may be formed of a polymeric material, such as by blow moulding or injection moulding. The polymeric material may be provided with the pattern having oleophilic properties attracting fat or oleophobic or properties repelling fat (or both). Alternatively, the container may be formed of a first polymeric material coated with a second polymeric material provided with the pattering having the oleophilic properties attracting fat at the sealing surface (or oleophobic properties repelling fat (or both)).

The shape of the ridges and valleys of the pattern may be varied. The ridges may be smooth undulations or shaped as triangular prismatic bodies.

The sidewalls 12a-d may be formed of a single piece material being wrinkled 18 at the corners to accommodate the surplus material. Such wrinkling is typically used for paperboard containers. The sidewalls 12a-d may alternatively be formed from separate flaps extending from the bottom wall 11 and being attached to each other at the corners.

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted container variants may be combined with other known methods. Other aspects, advantages and modifications within the scope of the invention will be apparent to those skilled in the art to which the invention pertains.

The invention claimed is:

1. A paperboard food container comprising:
    one or more sidewalls,
    a bottom wall, and,
    a sealing surface formed of or attached to the one or more sidewalls,
    wherein the sealing surface is coated with at least one polymer, and
    wherein the at least one polymer is provided with a pattern of ridges and valleys mechanically formed in the at least one polymer such that the sealing surface has oleophilic properties attracting fat such that any fat on the sealing surface has a tendency to settle down in the valleys of the pattern in the polymer on the sealing surface.

2. The paperboard food container according to claim 1, wherein a distance between a top plane to which a median of the ridges extend up to and a bottom plane to which a median of the valleys extend down to is from 2 to 200 micrometers.

3. The paperboard food container according to claim 1, wherein a median distance between adjacent ridges is from 1 to 500 micrometers.

4. The paperboard food container according to claim 1, wherein the bottom wall and the one or more sidewalls are integrally formed.

5. The paperboard food container according to claim 1, wherein the sealing surface is coated with a mixture of polymers.

6. The paperboard food container according to claim 1, wherein the sealing surface has combination of oleophobic properties and oleophilic properties.

7. The paperboard food container according to claim 5, wherein the pattern is provided by mechanically forming the pattern in an upper surface of the mixture of polymers.

8. The paperboard food container according to claim 6, wherein the pattern provides one or more oleophilic channels for conveying the food, fat, oil or emulsion.

9. The paperboard food container according to claim 1, wherein the sealing surface is coated with the at least one polymer in a coating step in which coating step the at least one polymer is provided with the pattern.

10. The paperboard food container according to claim 1, wherein the paperboard food container is produced from food grade materials, and wherein the paperboard food container is a microwavable container allowing the paperboard food container and food received in the paperboard food container to be heated in a microwave oven or an ovenable container allowing the paperboard food container and food received in the paperboard food container to be heated in a conventional oven.

11. The paperboard food container according to claim 1, wherein the paperboard food is configured to be distributed in a flat-laid state in the form of a web or sheet comprising a plurality of such flat-laid blanks adapted to be shaped into the paperboard food containers, or in a flat-laid state in the form of individual blanks adapted to be shaped into the paperboard food containers, or in an erected state with the one or more sidewalls extending upwardly from the bottom wall.

12. A container package comprising a paperboard food container according to claim 1 and a cover attached to the sealing surface.

13. The container package according to claim 12, wherein the cover is provided with a sealing surface being sealable to the sealing surface of the paperboard food container.

14. The paperboard food container according to claim 1, wherein a distance between a top plane to which a median of the ridges extend up to and a bottom plane to which a median of the valleys extend down to is from 2 to 100 micrometers.

15. The paperboard food container according to claim 1, wherein a median distance between adjacent ridges is from 1 to 150 micrometers.

* * * * *